United States Patent [19]
McGushion

[11] Patent Number: 5,196,664
[45] Date of Patent: Mar. 23, 1993

[54] ORBITAL WELDER FOR HIGH PURITY WELDING

[76] Inventor: Kevin D. McGushion, 2450 Oak St. #E, Santa Monica, Calif. 90405

[21] Appl. No.: 702,812
[22] Filed: May 20, 1991
[51] Int. Cl.⁵ ............................................. B23K 9/00
[52] U.S. Cl. ................................................ 219/60 A
[58] Field of Search ............................... 219/60 A, 61

[56] References Cited
U.S. PATENT DOCUMENTS 3,238,347  3/1966  Rohrberg et al. ............... 219/60 A
4,379,215  4/1983  Rohrberg ........................ 219/60 A
4,810,848  3/1989  Kazlauskas ..................... 219/60 A Primary Examiner—Clifford C. Shaw
Attorney, Agent, or Firm—Donald D. Mon

[57] ABSTRACT

An orbital welder for welding tubes includes a welding head and a hinged clamp arrangement which grasps the tubes and holds them in abutment for welding. The clamp is constructed to discharge shielding gas into the welding region. By supplying gas only from the clamp, a high purity weld is achieved.

10 Claims, 3 Drawing Sheets

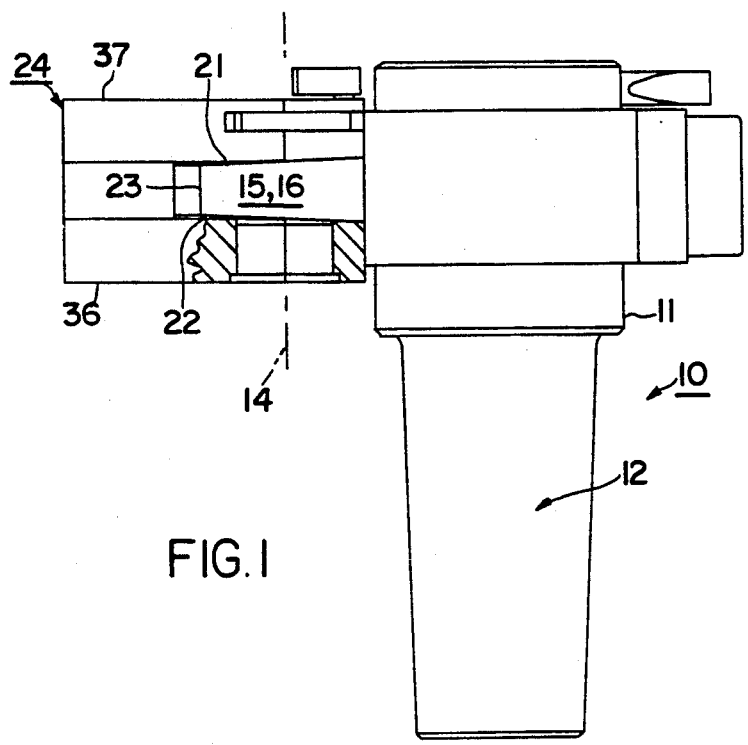
FIG.1
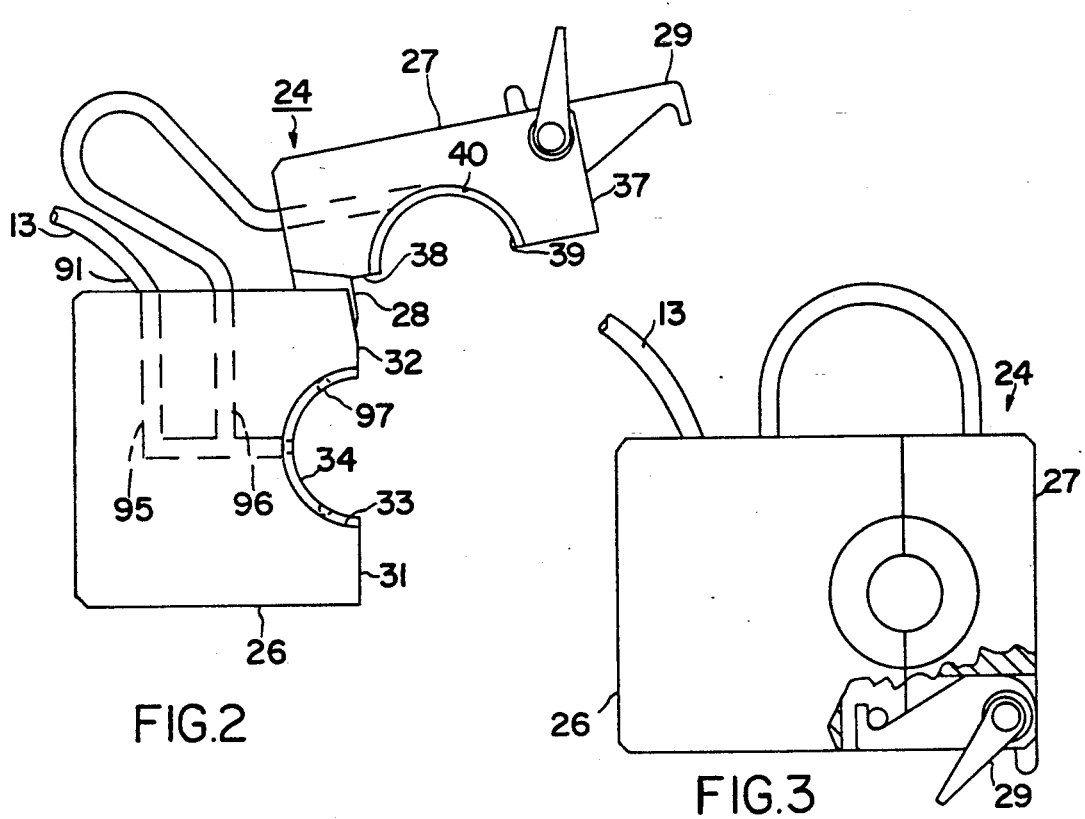
FIG.2
FIG.3

ORBITAL WELDER FOR HIGH PURITY WELDING

FIELD OF THE INVENTION

This invention relates to welding of metal, especially to butt welding together of fluid-conveying structures where integrity and purity of the weld are of utmost importance.

BACKGROUND OF THE INVENTION

A preferred method for joining two circularly-ended tubular segments such as pipes or tubes, or projections from other components is to butt their ends together and orbitally weld them. By orbital is meant to apply a flame or arc to their abutment, and rotate the segments past the flame or arc, or rotate the flame or arc around the segments, the latter being the preferred practice. The terms "tube" and "pipe" are used interchangeably in this specification.

The butt-welding of two pipe or tube segments is a primary application of this invention, but it is far from the only one. It is also common to butt-weld fittings and other components such as valves and regulators to a tube or pipe, or to each other. What all of these have in common is a circularly-shaped tubular end, appropriate for making an orbital weld and long enough to be held by the clamp portion of this weld head. Therefore the scope or applicability of this invention is not limited to the welding of tubes or pipes, but is generic to all abutments suitable for an orbital weld.

It is quite common for the orbital welding procedure to be supplemented by special techniques such as shielding with an inert gas, or with mixes of various shielding gases. The objective of the shielding is to protect the molten metal from oxygen, moisture, hydrocarbons, and other contaminants, so that the weld is made entirely of parent metal. It is now known that such impurities are often not merely surface imperfections, but also migrate into the weld itself, which is undesirable. Furthermore, even when the weld is reliable its surface must be cleaned, which can be quite expensive to do.

A considerable inconvenience inherent in known orbital welders is the difficulty of pre-assembling the components precisely in line, and then locating the orbital device squarely on the central axis of the tubes. When this is accomplished the weld can be consistent and true. Otherwise the weld may be faulty.

It is an object of this invention to provide an orbital welding head and clamp assembly into which the tubes can be inserted laterally, the clamp thereafter acting as a precise jig to hold the tubes while the orbital head makes an accurate weld. This welder quickly and accurately receives and holds the components, and quickly and smoothly welds the butted ends together. It may require only one pass, or more than one pass, depending on the welding procedure, which is usually programmed into a computerized power supply.

It is another object of this invention to avoid the tendency of known welders to blow particulates at the weld because, in these known welders the gas is passed through particle-generating components such as gears, brushes and rotors on its way to the weldment. Also, residual contamination often remains in many crevices in known heads, which are dislodged by the gas stream and carried to the weld by the gas. This invention provides the welder with a gas stream which tends to flush particulates away from the weld, rather than toward it, and provides this gas by means of a high purity passage through the fixturing block, or whatever device is used to fixture the components being welded. The gas flow is through the clamp toward the weld region for this purpose. This avoids or at least greatly minimizes particulate contamination of the weld because the gas does not pass through particle-generating regions.

Yet another object of this invention is to provide a physical shield between the weld region and the moving mechanical parts of the weld head to ward off contaminants from that source. This also reduces the volume of the region that must be occupied by the shielding gas.

BRIEF DESCRIPTION OF THE INVENTION

An orbital welding head according to this invention includes a body with a rotary drive means. Two rigid jaws project laterally from the body. They form a central circular track. The jaws and the track are separated by an access gap which is at least as wide as the largest pipe diameter intended to be welded by the weld head.

A circular rotor, also interrupted by a similarly-sized gap, is rotatably mounted to the track. The jaws and the rotor are formed in a circular "C" shape. The arcuate length of the rotor is greater than the width of the gap so that the rotor will be retained by the track even when much of its periphery is unsupported in the gap.

A drive train from the drive means engages the rotor at a plurality of engagement points, spaced apart farther than the width of the gap. Then the rotor will always be driven by at least one of them, and often by both of them. Rotor supports bear against the rotor at least four spaced-apart points so as always to support the rotor for driven rotation in the weld head at least three points, thereby always to keep the rotor properly centered on its axis of rotation.

An electrode projects inwardly from the inside of the rotor, terminating at an end from which the arc will strike toward the weldment. It is driven with the rotor around the central axis of the welder to make the weld. The rotor itself is made of conductive metal for this purpose.

According to one feature of this invention, an electrically conductive bus is biased against and slidingly bears against the rotor over a substantial area in order to supply current for the arc, while making a good large area contact that significantly minimizes heat generation in the head. Furthermore, it is retractable to enable the rotor to be removed and replaced, and biases the rotor against rollers at its support points.

Clamp means is provided as a hinged structure which can be opened to receive the pipe segments and closed to hold them in place. The clamp means includes a body that can be joined to the body of the weld head so the two are brought accurately together. It straddles the open part of the weld head.

The clamp means has inserts, each of which has a circular arc of the intended tube radius to be welded, but less than 180 degrees. They are part of the same circle when brought against a pipe of exact size to hold the pipe precisely on axis, but the jaws are then spaced apart by an offset dimension in order to be certain that the clamp can properly grip the pipe in the event that the pipe dimensions are not precise, either larger or smaller. This arrangement provides a strong and reliable grip, often continuous around most of the periphery of the pipe even when the pipe is somewhat out of tolerance, and is centered on the same axis as the rotor.

According to another feature of this invention, gas supply means discharges into the weld region from the clamp, rather than from the rotor, whereby to exclude particulates which could originate from the rotor and migrate into the weld. The gas is supplied through a high purity gas line so as not to entrain contaminants from this source.

According to still another feature of the invention, an insulating ceramic ring internally lines the rotor. It has an axial length greater than that of the rotor, thereby effectively shielding the weldment against contaminants from the driving portions of the weld head, occupying volume so as to reduce the region which must be filled with shielding gas and providing a heat shield.

The above and other features of this invention will be fully understood from the following detailed description and the accompanying drawings, in which:

BRIEF DESCRIPTION OF THE DRAWINGS

FIG. 1 is a side view, partly in cutaway cross-section, showing the presently preferred embodiment of the invention;

FIG. 2 is a top view of the clamp portion of FIG. 1, in its open condition;

FIG. 3 is a top view of the clamp portion of FIG. 1, in its closed condition;

DETAILED DESCRIPTION OF THE INVENTION

Figure 4:
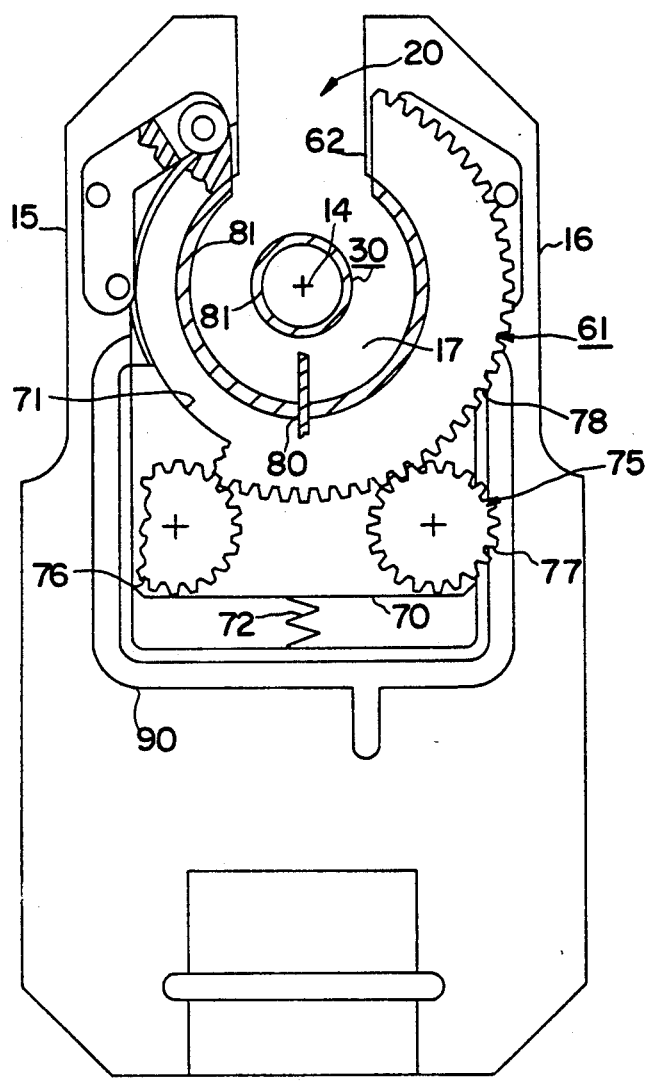
FIGS. 4 and 5 are fragmentary sections showing parts of the device of FIG. 1.
Figure 5:
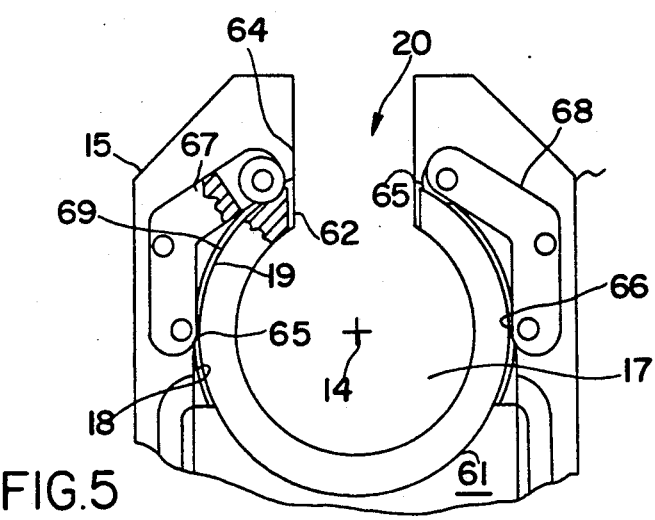

A welder 10 according to the invention is shown in FIGS. 1, 4 and 5. It includes a body 11 which houses a drive means 12 such as an electric motor. A gas supply connection 13 receives shielding gas from any suitable source. There is a nominal central axis 14 between a pair of jaws 15, 16. These jaws project laterally from the body. The jaws form a circular cavity 17 normal to the axis. The cavity wall 18 forms a track 19 which will later be described in more detail.

A gap 20 having a width at least as wide as the largest pipe diameter to be welded separates the jaws. The jaws have top and bottom surfaces 21, 22 so as to form a blade-like tongue 23.

Clamp means 24 (FIGS. 1, 2 and 3) is a split construction. Base portion 26 is mounted to the body and can if desired form an internal part of the body. Usually it will be attached to it. Closure portion 27 is mounted to the base portion by a hinge 28. A latch 29 releasably holds the closure portion in its closed condition wherein the clamp surrounds and engages tubes 30 to be butt-welded together.

Base portion 26 lies against the tongue 23. On each side of the tongue it has a pair of spaced apart jaws 31, 32. The jaws have a socket surface 33 on the inside of the jaws to receive a socket half 34. Surface 33 is preferably part of a cylinder, and the outside wall of the socket half fits snugly against it. A flange 35 on the socket half locates the socket half in the jaws.

Closure portion 27 includes a pair of spaced apart blade-like plates 36, 37 joined by a base plate. These plates closely fit over the tongue in the closed condition. The closure portion is hinged out of the way in the open condition. It also includes in each of its plates a pair of jaws 38, 39, with a socket surface 40 like surface 33. Another socket half 41 fits in socket surface 40.

Figure 8:
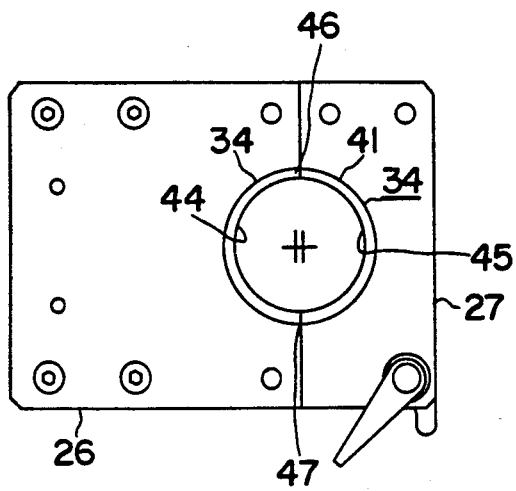
FIGS. 6, 7 and 8 show the manufacture and use of a part of the clamping means.
Figures 6, 7:
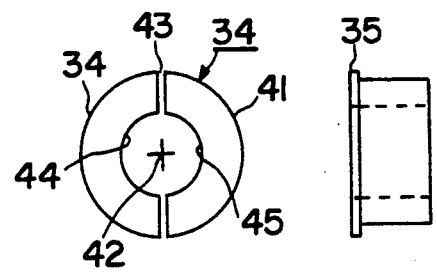

The construction of the socket halves is of particular importance, and is best understood by the method of making them. With reference to FIGS. 6–8, socket halves 34 and 41 are shown in the locations they had when they formed part of a complete tube, in which the inner diameter and outer diameter were formed concentric with central axis 42.

Then an accurate saw cut 43 was made, removing a precise width of material, and forming the socket halves as individual pieces. It will be seen that gripping surfaces 44, 45 are less than 180 degrees and that when their faces 46, 47 are brought together, their centers will be offset from the central axis by one half of the width of the jaw cut.

Thus, when tubes having the outer diameter of the largest anticipated tubing size are gripped, the socket halves will be spaced from each other by the amount of offset, i.e., the width of the saw cut, and the grip surface will make full contact with the entire wall of the pipe.

This arrangement enables the socket halves to grip tubes that are somewhat smaller than anticipated the nominal diameter, because the surfaces will center on the tube and can approach each other even when the tube is out of tolerance. The same is true of exact and larger than normal size, because the small dimensional differences will usually be accommodated by exact fit or by slight compression of the tubes.

Figure 10:
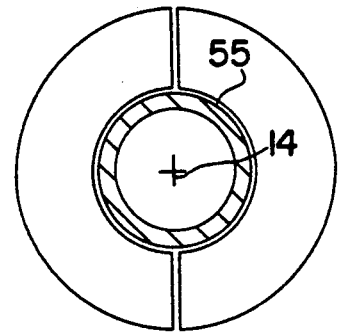
FIG. 10 shows inserts holding a tube to be welded.
Figure 9:
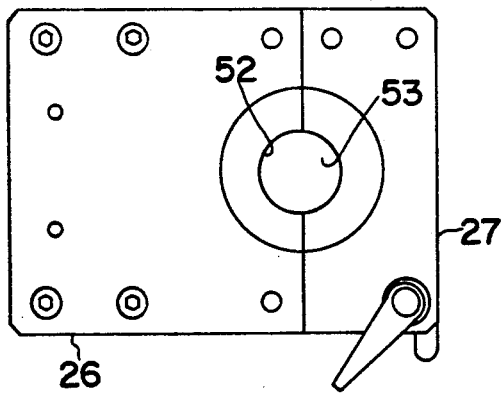
FIG. 9 shows an insert according to the prior art.

This arrangement contrasts with known inserts such as shown in FIG. 9, where a central hole is first closely drilled in a block. The block is next cut to remove a width (thickness) of material. Then the socket halves are brought together, and the outer diameter is turned or ground around a center 51 between the two partial arcs 52,53. This results in a different and less desirable spatial relationship with the tubes when the clamp is closed. These prior art inserts are also more troublesome and expensive to manufacture. In both situations, the arrangement of FIG. 10 results with a properly sized pipe 55.

The foregoing describes the clamping means whereby a pair of tubes can accurately be held in abutment between the various sets of jaws in order to be butt-welded together.

Now with reference to FIGS. 4 and 5, a track 19 is shown in the circular portion of the body tongue. A rotor 61 is rotatably fitted in this track so that it rotates around the central axis. The rotor has an inside diameter suitably larger than the largest pipe diameter to be welded. It also has a gap 62 of width sufficient to pass that pipe. Its peripheral length is greater than the gap width so it will always be supported in the track, whatever its rotary position.

Rotor 61 is supported for rotation by four bearings 63,64,65,66. These are provided in pairs on opposite sides of the gap. For convenience the bearings of each pair are mounted to plates 67,68 which can very accurately locate the bearings relative to the central axis. Plates 67 and 68 do not rotate. The bearings run in a track 69 in the outside of the rotor.

The four bearings are all on the same side of an axial plane which extends across the jaws. They are spaced so that, wherever the gap is located, at least three bearings will support and locate the rotor. For this purpose, the rotor is biased toward the bearings, from the opposite side of the plane.

This bias force is exerted by a conductive bus 70. This bus has an arcuate edge 71 which also fits in track 69. A bias spring 72 in compression between the body and the bus presses the rotor toward the bearings. The bus and the rotor are both made of electrically conductive material. The bus is connected to a suitable power source (not shown).

A power drive train 75 includes a pair of drive gears 76,77 that form the output end of the gear train from a drive motor (not shown). The rotor is provided on its outside with gear teeth 78 which mesh with gears 76 and 77.

Gears 76 and 77 are spaced apart by a distance larger than the width of the gap in the rotor. Thus the rotor will always be engaged by at least one of these gears, and often by both of them. There may be some looseness of fit between the gears and the gear teeth.

The bearings are disposed such that the rotor is always supported at least three points. This assures that the rotor will never move off of centricity.

An electrode 80 projects inwardly from the inner diameter of the rotor preferably at its center. It is directed squarely at the axis, and its tip will be appropriately spaced from a pipe 81 to be welded (see FIG. 4). The rotor will be made of a conductive metal, preferably a copper alloy. It will be suitably insulated from adjoining structure and parts and connected to a source of current (not shown).

A heat resistant shield 81 is fitted inside the rotor. It extends axially for a distance suitably to shield the weld region from particulates that might migrate from the drive section. It also shields the rotor from the heat of the arc. Because the rotor is made of conductive material, preferably of copper, it is best practice to shield it from excessive temperatures. This ring accomplishes that purpose. It also reduces the volume which must be occupied by shielding gases. The electrode passes through a hole in the shield.

Again to minimize internal heating in the welding head, attention is paid to the transference of electrical energy to the rotor. The rotor must, of course, rotate and slip means must be provided for it. Small area contacts can heat up undesirably, as can irregular contacts. According to this invention, the bus has a substantial area in contact with the rotor, thereby reducing the resistance at this point.

It is necessary to shield the arc, or more properly the molten metal, from the atmosphere. In the prior art it is common practice to direct a shielding gas toward the weld, but through mechanisms which may introduce contaminants into the gas stream. This can lead to rejection of welds.

In this invention, the gas is not supplied through the welding head, but instead is supplied from the clamp, and in such a pattern as to blow back toward the mechanism any particulates which it might generate.

It should be noted that the gas stream is not especially vigorous. Instead it is intended to fill the region inside the clamps and rotor with the shielding gas, whereby to exclude oxygen and maintain a small positive pressure that tends to resist entry atmospheric gases, particulates, and impurities into this region.

Gas supply passages 90 are formed in the body which lead to hose connections 91,92. In turn hoses 93,94 are connected to connection 91, and the gas passages 95,96 in the base portion and in the closure portion of the clamp. In turn, passages 95,96 discharge into regions inside the clamp, and thence into the weld region. Both sides of both clamp portions are similarly supplied. It will be observed these gas lines can be made to high purity standards, and that the gas flow does not pass through moving parts on its way to the weld region. Gas emits through orifices 97 into the weld region.

This invention provides an elegantly simple orbital weld head. A pair of components to be joined can quickly and accurately be located and welded together. It is able to receive a wide assortment of components, requiring only that there be a tubular portion suitable for orbital welding, and of sufficient length that it can be held by the clamp.

All gas flow to the weld region is through very clean passages, and the tendency is to exclude, rather than to entrain impurities.

This invention is not to be limited by the embodiment shown in the drawings and described in the description, which is given by way of example and not of limitation, but only in accordance with the scope of the appended claims.

I claim:

1. An orbital welder comprising a welder head and a clamp means, said welding head comprising a body having an axis around which a weld is to be formed, and having a pair of spaced apart blade-like head jaws, said head jaws forming a track normal to said axis interrupted by an access gap, a ring-like rotor rotatably engaged to said track, said rotor being circular and interrupted by an access gap, the peripheral length of the rotor being greater than the width of the access gap in the head jaws, drive means engaging said rotor to rotate it, an electrode mounted to said rotor and projecting inwardly toward said axis, said rotor being electrically conductive, and having an external track, a conductive bus having a curved edge in conductive sliding contact with the track on said rotor, and drive means driving said rotor;

clamp means, said clamp means having a base portion mounted to said body, and a closure portion hingedly mounted to said base portion, each said portion comprising a pair of blade-like members joined together to fit over said blade-like head jaws when the portions are brought together, each said portion having a pair of jaws with socket surfaces adapted to receive respective socket halves in order to grasp tubes to be held in abutment whereby at least partially to bound a welding region between said blade-like members in which the rotor turns; and gas supply means connected to said clamp portions adapted to discharge shielding gases into said region, gas being supplied to said region only from said clamp portions.

2. A weld according to claim 1 in which said rotor is supported in said track by at least four bearings, two on each side of side gap, and so disposed and arranged that at least three of said bearings are always in contact with said track, thereby accurately to position said rotor, said bearings all being on the same side of an axial plane which is normal to said gap, said rotor being springely biased toward and against said bearings.

3. A welder according to claim 1 in which said bus is spring-biased toward and against said rotor in curvilinear contact therewith.

4. A welder according to claim 1 in which an insulating ring is mounted to the internal periphery of the rotor, said ring having a gap similar to that of the rotor, and having an axial length longer than the thickness of the rotor, the electrode passing through said insulating ring, whereby said rotor is shielded from the heat of the arc, and shields the weld region from particulates and impurities from the drive means.

5. A welder according to claim 1 in which said socket halves are formed from a tube having concentric inner and outer diameter, and from which there has been cut a diametral portion of known thickness, proportioned as to enable opposed socket halves to engage with tubes somewhat larger or smaller than their normal size in order to hold said tubes in abutment for welding, said socket surfaces and socket halves having the same center.

6. A welder according to claim 1 in which said gas supply means is formed by high-purity gas lines.

7. A welder according to claim 6 in which said rotor is supported in said track by at least four bearings, two on each side of said gap, and so disposed and arranged that at least three of said bearings are always in contact with said track, thereby accurately to portion said rotor, said bearings all being on the same side of an axial plane which is normal to said gap, said rotor being springely biased toward and against said bearings.

8. A welder according to claim 7 in which said bus is spring-biased toward and against said rotor in curvilinear contact therewith.

9. A welder according to claim 8 in which an insulating ring is mounted to the internal periphery of the rotor, said ring having a gap similar to that of the rotor, and having an axial length longer than the thickness of the rotor, the electrode passing through said insulating ring, whereby said rotor is shielded from the heat of the arc, and shields the weld region from particulates and impurities from the drive means.

10. A welder according to claim 9 in which said socket halves are formed from a tube having concentric inner and outer diameter, and from which there has been cut a diametral portion of known thickness, proportioned as to enable opposed socket halves to engage with tubes somewhat larger or smaller than their normal size in order to hold said tubes in abutment for welding, said socket surfaces and socket halves having the same center.

* * * * *